United States Patent [19]
Lawwill

[11] Patent Number: 5,957,473
[45] Date of Patent: Sep. 28, 1999

[54] REAR SUSPENSION BICYCLE

[75] Inventor: Mert Lawwill, Bayfield, Colo.

[73] Assignee: Schwinn Cycling & Fitness Inc., Boulder, Colo.

[21] Appl. No.: 08/616,591

[22] Filed: Mar. 15, 1996

[51] Int. Cl.⁶ .................................................. B62K 25/30
[52] U.S. Cl. ........................ 280/284; 280/285; 280/281.1
[58] Field of Search .................................... 280/283, 284, 280/285, 275, 281.1; 180/227

[56] References Cited

U.S. PATENT DOCUMENTS

| | | | |
|---|---|---|---|
| D. 368,678 | 4/1996 | Wilcox et al. . | |
| 3,917,313 | 11/1975 | Smith et al. | 280/284 |
| 4,058,181 | 11/1977 | Buell | 280/284 |
| 4,114,918 | 9/1978 | Lutz | 280/284 |
| 4,789,174 | 12/1988 | Lawwill | 280/284 |
| 5,121,937 | 6/1992 | Lawwill | 280/284 |
| 5,332,246 | 7/1994 | Buell . | |
| 5,335,929 | 8/1994 | Takagaki et al. . | |
| 5,354,085 | 10/1994 | Gally | 280/284 |
| 5,409,249 | 4/1995 | Busby | 280/284 |
| 5,413,368 | 5/1995 | Pong et al. . | |
| 5,452,910 | 9/1995 | Harris . | |
| 5,509,679 | 4/1996 | Leitner . | |
| 5,553,881 | 9/1996 | Klassen et al. . | |

*Primary Examiner*—Daniel G. DePumpo
*Attorney, Agent, or Firm*—Holland & Hart LLP

[57] ABSTRACT

A suspension bicycle includes swing arms, control arms and control links which are connected pivotably to an otherwise rigid frame to form a trapezoidal arrangement configured with a shock absorber forward of the seat riser tube to permit absorption of energy imparted to the bicycle by substantially vertical forces such as caused by shocks while transmitting to the rear wheels without significant loss energy imparted to the bicycle by substantially forward such as pedaling.

14 Claims, 5 Drawing Sheets

5,957,473

REAR SUSPENSION BICYCLE

FIELD OF THE INVENTION

This present invention relates to bicycles, and more particularly relates to bicycles employing suspension means for at least the rear wheel.

BACKGROUND OF THE INVENTION

Bicycles have long been used as a means of transportation and recreation. Virtually all bicycles known in the prior art have involved a relatively rigid frame, which transmits directly to the rider shocks resulting from potholes, rocks or other unevenness in the riding surface. This has resulted in discomfort to the rider which is at the least undesirable, if not unacceptable.

The typical solution to this problem found in the prior art has been to include a shock absorbing suspension on the bicycle similar to those found in motorcycles or on cars. The difficulty with nearly all prior art designs is that each of them absorbs a significant amount of force which would otherwise provide forward movement. While this loss is not significant for a motorcycles or a car, it is unacceptable where the only available motive force is the pedaling of a human being.

More recently, the inventor of the present application has discovered various techniques for minimizing energy loss in bicycle suspensions. Rear suspensions for bicycles are shown in both U.S. Pat. No. 4,789,174 and U.S. Pat. No. 5,121,937. While the suspension designs described in these patents offered many advantages over all prior art designs, limitations exist on the range of geometries available with such designs.

As a result, there has been a need for an alternative to such prior art 15 designs.

SUMMARY OF THE INVENTION

The present invention provides a bicycle suspension which transforms substantially all of the pedaling force into forward motive force by providing a novel and unobvious linkage arrangement which neutralizes the tendency of the suspension to absorb the pedal force.

More specifically, the present invention provides a linkage which creates a vectored force substantially equal to and opposite from the pedaling force which would normally be absorbed by the suspension of the bicycle. As a result of this cancellation of forces, nearly all of the pedaling force is converted to forward motion. While the advantages provided by the present invention are particularly applicable to bicycles, the energy saving features of the present invention may be implemented in motorcycles or other motor driven vehicles.

In a presently preferred embodiment of the present invention, the desired balance is substantially achieved by providing a pair of swing arms pivotally mounted at or near the bottom bracket of the bicycle and extending toward the hub of the rear wheel. A pair of control arms is pivotally affixed about the seat riser tube and each has a rear portion extending toward the hub of the rear wheel together with a forward portion that extends toward the down tube of the bicycle frame. The forward portion of the control arms connects to the plunger of a shock absorber, such that upward movement of the control arms pulls on the plunger and compresses the shock absorber.

A pair of control links, on which the rear wheel is mounted, connects at its top to the rear end of the control arms, while the control links connect at their bottoms to the swing arms. Because of the geometry of the connecting holes in the control links, the rear end of the swing arms is maintained slightly closer to the seat riser tube than the rear of the control arms. This careful maintenance of position maintains the suspension in careful balance during pedaling, while at the same time working with the shock absorber to permitting absorption of shocks and unevenness in the riding surface.

It is therefore one object of the present invention to provide a suspension bicycle in which shocks are reduced by the cooperation of the geometries of the various arms together with a compressive shock absorber.

It is another object of the present invention to provide a suspension bicycle having an efficient combination of geometries to transmit pedaling forces to the wheels while still absorbing shocks.

These and other objects of the invention will be better understood from the following Detailed Description of the Invention, taken together with the attached Figures.

THE FIGURES

DETAILED DESCRIPTION OF THE INVENTION

Figure 1:
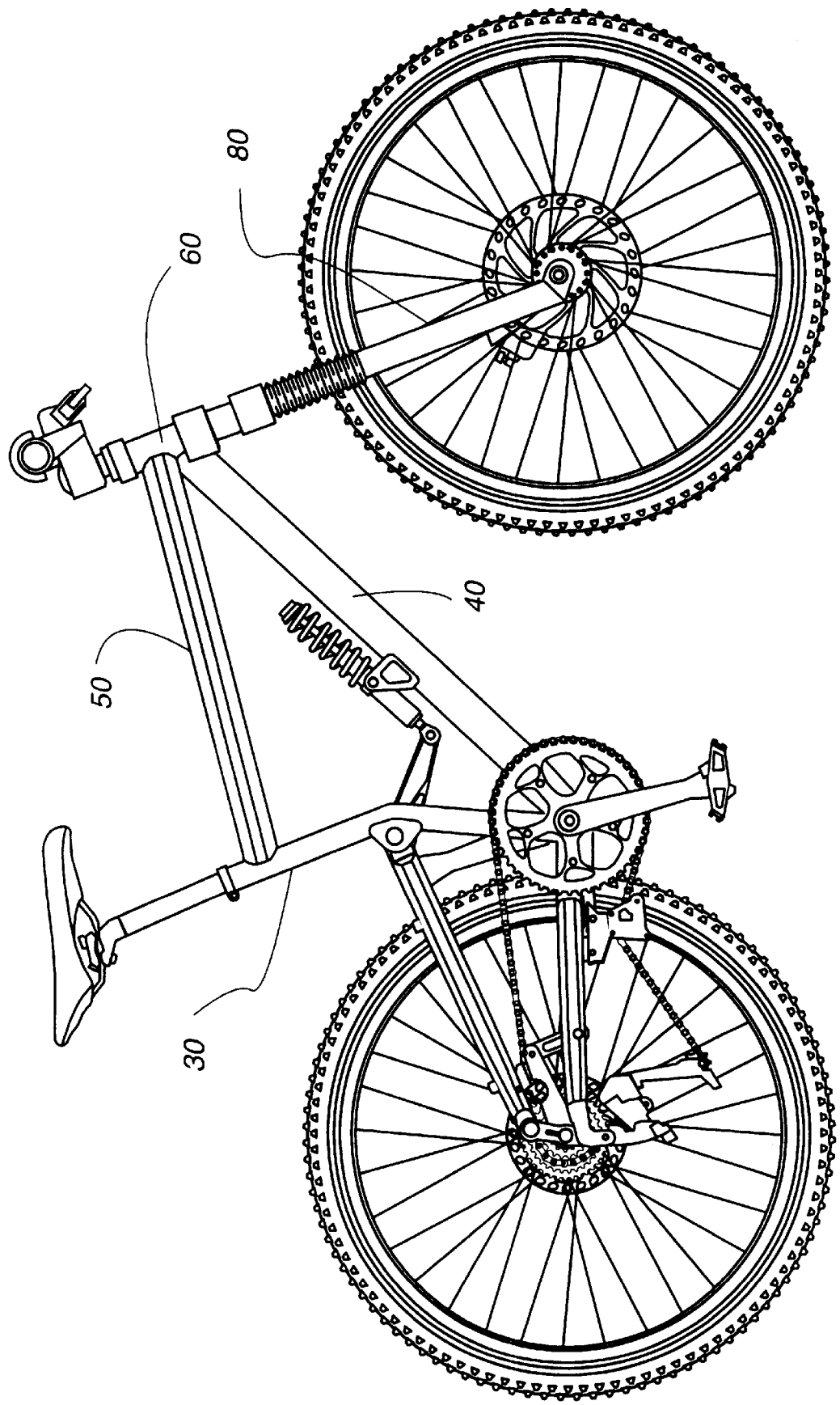
FIG. 1 is a view of a suspension bicycle according to the present invention.

Referring to FIGS. 1 through 5, the bicycle 10 of the presently preferred embodiment may be seen to include a frame 20 which includes a seat riser tube 30, a down tube 40, a brace tube 50, and a front fork tube 60. For convenience and clarity, the wheels, front fork, handlebars, control stem, headset, seat, pedals and so on are not shown in FIGS. 2–5, but are substantially conventional. It will be appreciated that the bicycle shown in the figures is a mountain bike, although the present invention could readily be applied to other types of bicycles or vehicles.

The seat riser tube 30 is rigidly affixed at its top to the brace 50, and is rigidly connected at its bottom end to the bottom bracket housing 70. The bottom end of the down tube is likewise rigidly affixed to the bottom bracket housing 70, while the top end of the down tube 40 is rigidly attached to the front fork tube 60. The brace tube 50 extends between substantially the top of the seat riser tube 30 and the front fork tube 60. Conventional front forks 80 are maintained within the front fork tube 60 in a conventional manner. The front forks 80 may include a shock absorber 100 of a conventional nature, such as ROCK SHOX™, or may be configured with a more sophisticated fork such as that shown in U.S. Pat. Nos. 5,299,820 or 5,429,380.

The rear suspension of the bicycle 10 comprises a pair of swing arms 140 (only one of which can be seen in FIG. 1) which are pivotably mounted at or near the bottom bracket housing 70. In the preferred embodiment shown, the swing arms pivot from a support 145 at the bottom of the seat riser tube 30. The rear end of the swing arms 140 are pivotably attached to their respective rear control links 150. The control links support the hub or axle 160 of rear wheel (not shown except in FIG. 1) through a bore 165. At their upper end the control links pivotably attach to a pair of control arms 170 (only one shown in FIG. 1). The front ends of the control arms 170 pivotably connect to the seat riser tube 30 at a pivot point 175 through a bracket 177 which may be formed integrally with the seat riser tube 30 or may be fabricated separately. For convenience of description, the pair of swing arms may occasionally be referred to as a single swing arm herein; likewise, the pair of control arms may occasionally be referred to as a single control arm. A disk brake assembly 179 may be mounted to the left side of the hub in a substantially conventional manner.

A shock absorber 180 is mounted to a bracket 183 affixed to the upper surface of the down tube 40. The shock absorber is typically a phenolic material, although any suitable arrangement is acceptable in at least some embodiments. A forward portion 185 of the control arms 170 extends from the pivot point 175 to the bottom of the plunger portion 187 of the shock absorber 180 and pivotably connects thereto at support 189, such that upward movement of the control arm 170 causes the plunger 187 to be pulled downward, thereby compressing the phenolic material.

The shock absorber travel is intended to provide substantially a 3:1 relationship between the travel of the rear wheel and the compression travel of the shock absorber, although other ratios are also acceptable depending on the particular application. The shock absorber 180 absorbs shocks during normal operation of the rear suspension comprised of the seat riser tube 30, the swing arms 140, control links 150, and control arms 170. Importantly, the rear suspension continues to provide the ability to absorb shocks even during pedaling.

Figure 4:
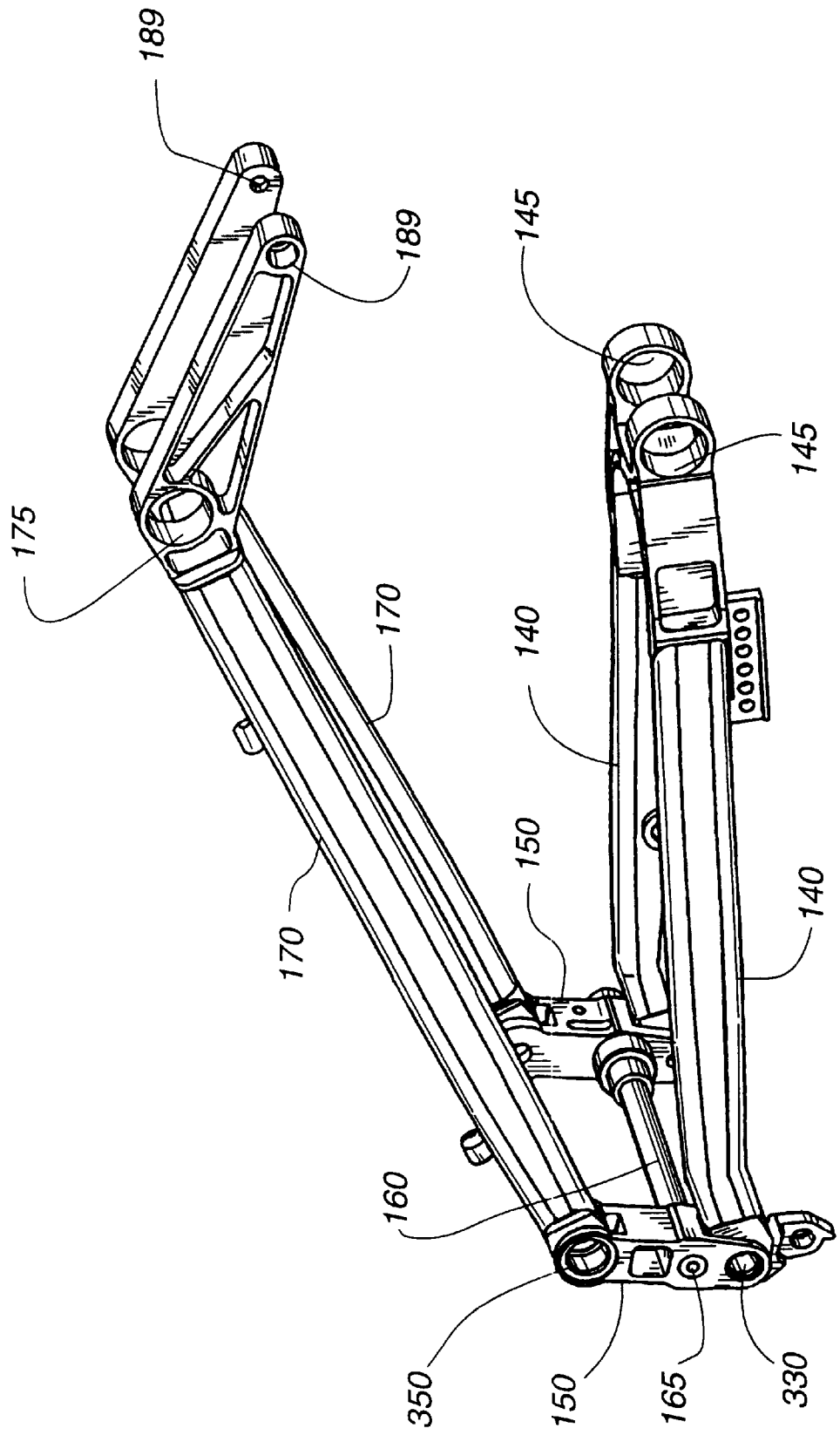
FIG. 4 is a right front three quarter perspective view of the control arms, swing arms, control links and hub of the present invention.
Figure 5:
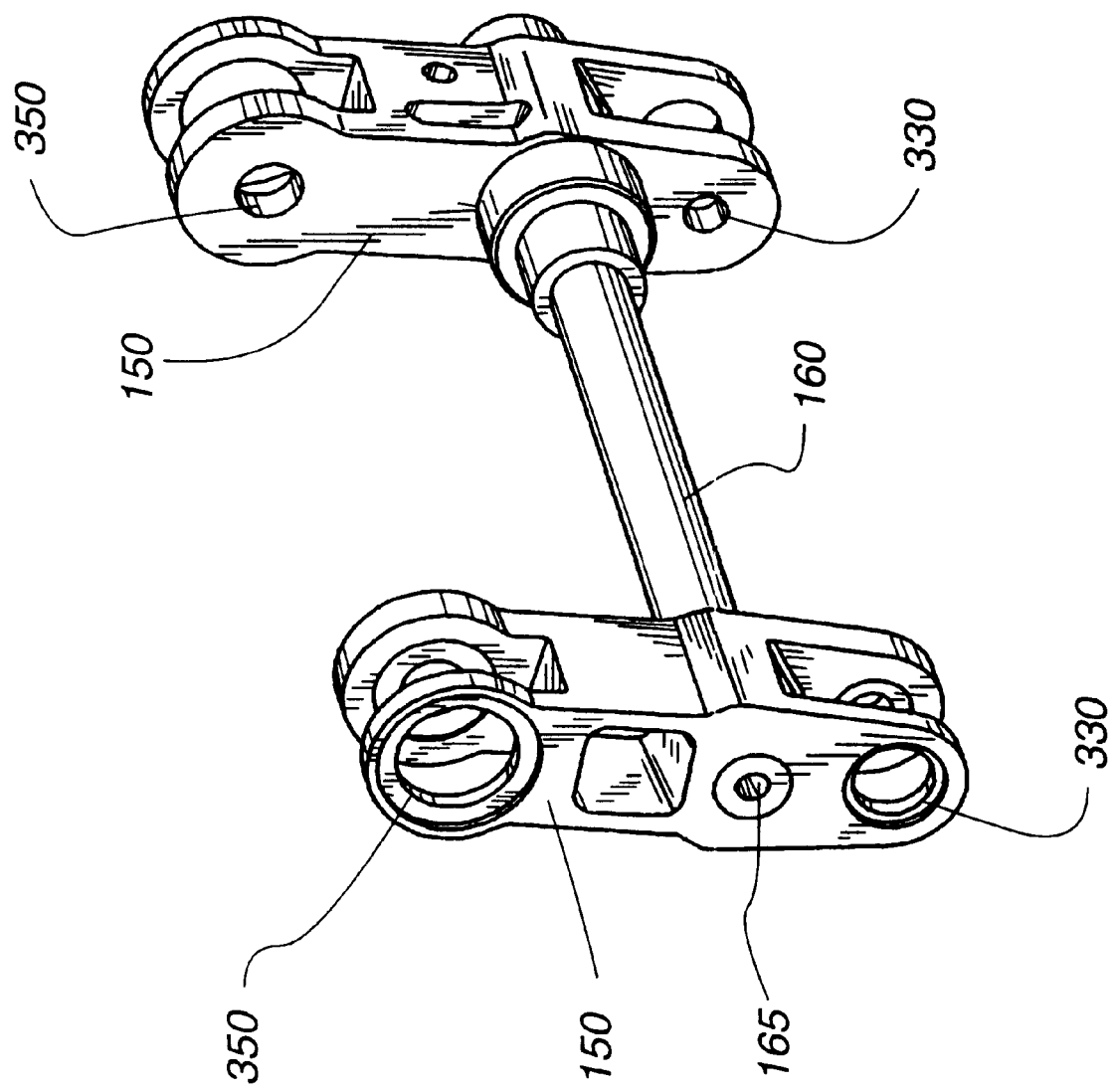
FIG. 5 is a detailed right side three quarter perspective view of the hub and control links.

Referring particularly to FIGS. 4 and 5, the rear portions of the control arms and swing arms may be better appreciated, together with the control links 150 and hub 160. The disk brake assembly 179 for the rear wheel is attached to the hub 160 at bore 165. Outboard of the disk brake is attached the control links 150, to which the swing arms 140 and control arms 170 are attached. The swing arms 140 attach to the control links 150 at a pivot point 330, while the control arms 170 attach to the control links at a pivot point 350.

Upon application of an upward force such as caused by running into a rock, uneven terrain or a jump, the swing arms 140 will move upward by pivoting about the pivot point 145. The upward force is transmitted into upward motion of the control arms 170, so that the forward portion 185 of the control arms 170 moves downward. The downward movement of the portions 185 pulls downward on the plunger 187, causing the shock absorber 180 to compress.

As the swing arms 140 move upward, their connection to the control links 150 forces the links 150 to pivot in a clockwise direction (FIG. 2) about the pivot point 330. The corresponding clockwise rotation of the pivot point 350 causes the control arms 170 to move slightly downward relative to the hub attachment point 165. Because the attachment point 165 is offset toward the pivot point 350 and away from the pivot point 330, and also because of the location of the pivot points 145 and 175, the control arms 170, the swing arms 140 and the control links 150 permit substantial travel of the rear suspension in response to a shock.

Figure 2:
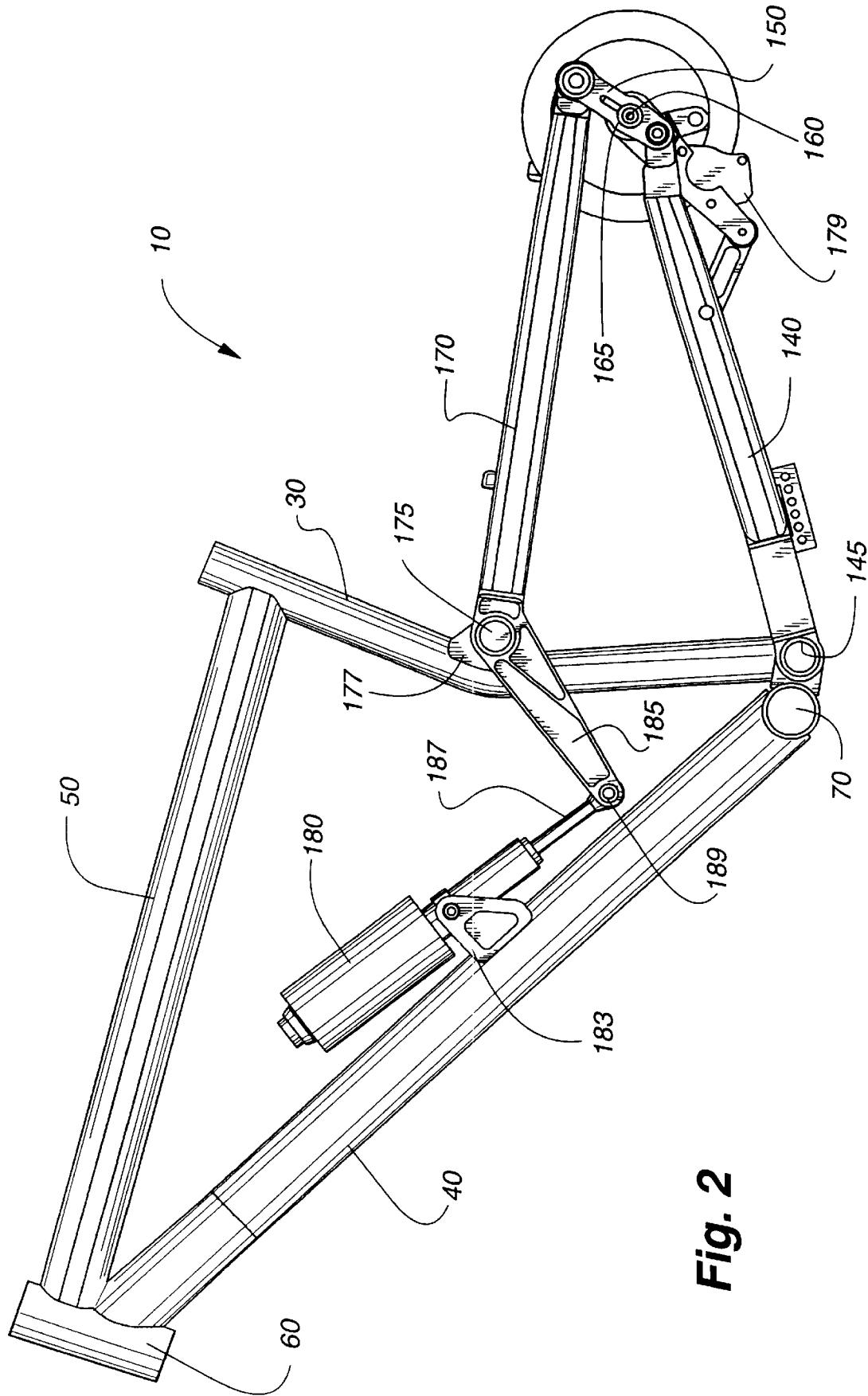
FIG. 2 is a side elevational view of the left side of the bicycle frame, including the control arms and swing arms.
Figure 3:
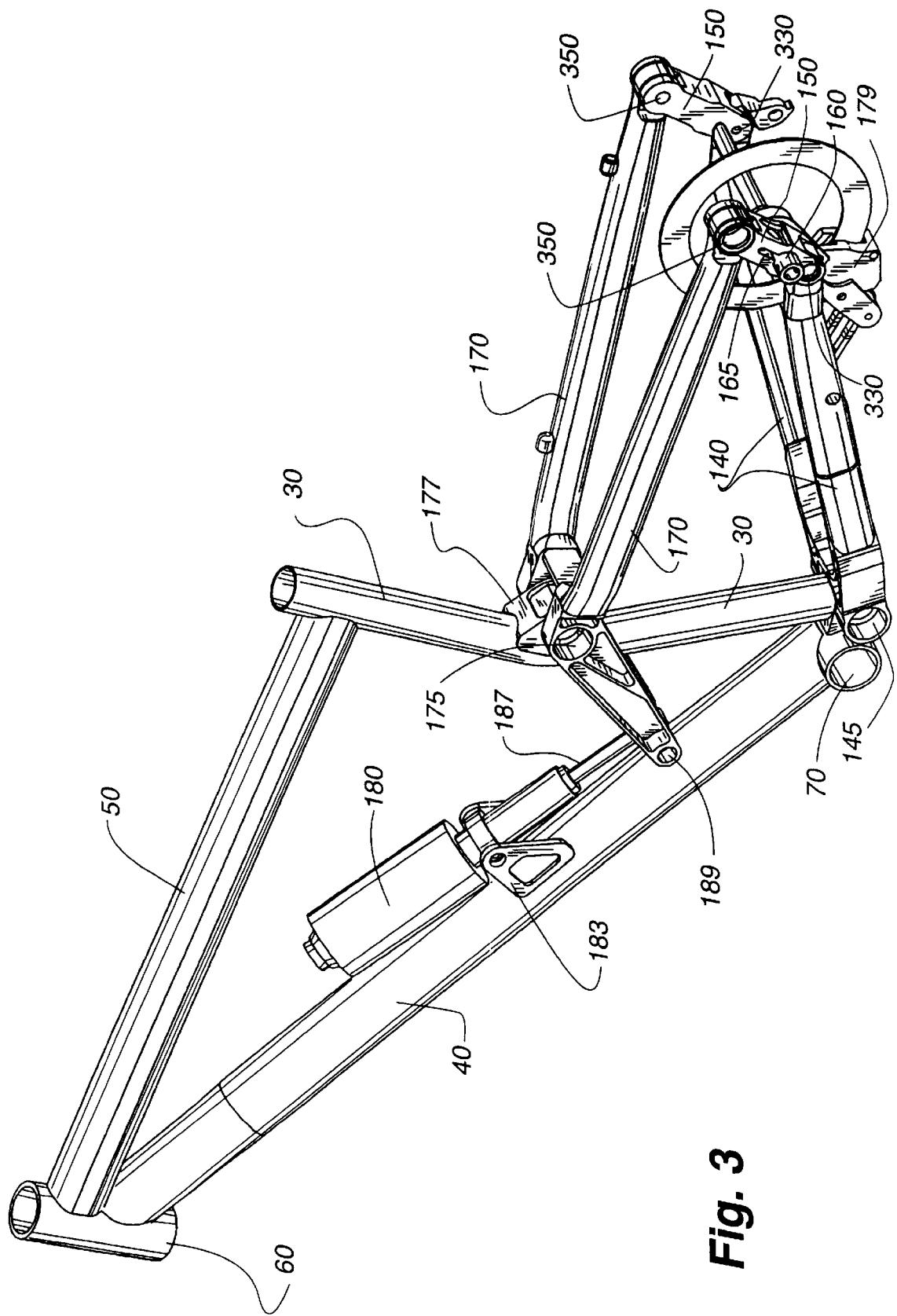
FIG. 3 is a left rear three quarter perspective view of the bicycle frame of FIG. 2.

The suspension system of the present invention moves reciprocally between an un-compressed (unloaded) configuration, as shown in FIG. 4, and a compressed (loaded) configuration, as shown in FIGS. 2 and 3. The transition occurs when the suspension system absorbs the force of an obstacle, causing the swing arms 140 to move upwardly, as discussed above.

In the compressed, or loaded, configuration in FIGS. 2 and 3, the pivot point 350 on the upper end of the control link is positioned above and behind the bore 165, and above and behind pivot point 330 on the lower end of the control link. In the compressed configuration in FIGS. 2 and 3, the pivot point 330 on the lower end of the control link is positioned below and substantially forwardly of the bore 165, and below and substantially forwardly of the pivot point 350 on the upper end of the control link.

In the unloaded, or un-compressed configuration in FIG. 4, the pivot point 350 on the upper end of the control link is positioned above and forwardly of the bore 165, and above and forwardly of pivot point 330 on the lower end of the control link. In the unloaded, or un-compressed configuration in FIG. 4, the pivot point 330 on the lower end of the control link is positioned below and behind the bore 165, and below and behind pivot point 350 on the upper end of the control link.

While the ability of the present invention to absorb shocks is a key feature, an equally interesting aspect of the present invention is that the suspension includes features which balance the tendency of a suspension to absorb pedaling energy, or other motive energy. The energy absorbing tendencies are neutralized by virtue of the trapezoid formed by the location of the pivot points 145 (the bottom bracket housing), 175, 330 and 350, together with the point 165 at which the rear wheel is affixed. It will be appreciated from FIGS. 2 and 3 that the pivot point 175 is located substantially above the attachment point 165, whereas the pivot point 145 is located only slightly below.

When a rotational force is applied to the hub 160 via the rear wheel, as during pedaling, the point 165 attempts to rise. Because of the control arm 170, the point 165 may only move in an arc about pivot point 175. However, the amount of movement is limited by the length of the swing arms 140, which can only pivot about the point 145. As a result, the swing arms 140, control arms 170 and control links 150 provide a force having a downward component. This downward force vector is applied quickly so that the rotational force applied to the rear wheel is translated efficiently into forward movement. It can therefore be appreciated that the control arms 170, control links 150, and swing arms 140 are configured to balance the forces applied to the rear wheel by the chain during pedaling so as to prevent energy absorbing movement of the rear suspension as the result of such pedaling.

It can further be appreciated that the balancing of forces between the control arms and the swing arms does not impose a mechanical limit on the travel of the rear wheel in response to shocks, but rather provides a locking out, or leverage limit, of movement in response to a chain force. This balancing of forces therefore permits substantially all of the rider's pedaling energy to be translated into forward movement, rather than being absorbed by the suspension system as occurs in the typical prior art.

An additional and unexpected feature of the present invention is that the bicycle of the present invention provides increased traction during operation, and particularly while climbing hills. The increased traction results because rotation of the control arms 170 appears to cause a transfer of weight to the swing arms 140. This, in turn, transfers the weight to a point higher over the axle center, resulting in increased traction.

In an exemplary arrangement, the approximate dimensions of the suspension trapezoid (measured from the centers of the respective pivot points) can be as follows: swing arms—16.4 inches; control arms—15.850 inches; distance between pivot point 145 and pivot point 175—8.5 inches; distance between the hub attachment point 165 and the swing arm pivot point 330—0.9 inches; distance between the attachment point 165 and the control arm pivot point 350, 1.75 inches; angle of seat riser tube down from vertical, 17°. The pivot points 165, 330 and 350 are substantially within a straight line, but could be varied somewhat without serious adverse consequences. Other geometries also work, and can be determined from the ratios of the dimensions provided above. Similarly, specific dimensions may be varied to adjust specific characteristics for the particular rider, so long as the foregoing basic teaching of balancing the forces is maintained.

Having fully described one embodiment of the present invention, it will be apparent to those of ordinary skill in the art that numerous alternatives and equivalents exist which do not depart from the invention set forth above. It is therefore to be understood that the invention is not to be limited by the foregoing description, but only by the appended claims.

What is claimed is:

1. A suspension bicycle having
a rear wheel with a hub,
a frame including a seat riser tube, a down tube and a bottom bracket housing having left and right sides,
a pair of control links, one for either side of the rear wheel, each having an attachment point for attaching to the hub of the rear wheel, a first pivot point located above the attachment point and a second pivot point located below the attachment point,
a swing arm assembly having a pair of forward pivot points and a pair of rear pivot points, the pair of forward pivot points adapted to pivotably connect to the frame at or near the bottom of the seat riser tube, the pair of rear pivot points each pivotably connected to the second pivot point of the respective one of the pair of control links,
a control arm assembly having at least one front pivot point and a pair of back pivot points, the at least one front pivot point pivotably connected to an upper pivot point on the seat riser tube and the pair of back pivot points each pivotably connected to the first pivot point of the respective one of the pair of control links, and
a shock absorber situated forward of the seat riser tube and connected between the control arm assembly and the down tube which compresses and extends to absorb shocks.

2. A suspension bicycle as defined in claim 1 wherein:
said control arm assembly has a forward portion extending forwardly of said seat tube and a rear portion extending rearwardly of said seat tube; and
said forward portion of said control arm assembly positioned at an angle with respect to said rear portion of said control arm assembly.

3. A suspension bicycle as defined in claim 1, wherein:
said control arm assembly has a forward portion extending forwardly of said seat tube and a rear portion extending rearwardly of said seat tube;
said shock absorber is a pull-shock having a plunger; and
said forward portion of said control arm assembly being attached to said plunger.

4. A suspension bicycle as defined in claim 2, wherein:
said shock absorber is a pull-shock having a plunger;
said forward portion of said control arm assembly being attached to said plunger; and
wherein when said rear portion of said control arm assembly is moved upwardly, said forward portion of said control arm assembly is moved downwardly, pulling said plunger downwardly and actuating said shock absorber.

5. A suspension bicycle having:
a rear wheel with a hub,
a frame including a seat riser tube, a down tube, and a bottom bracket housing;
a rear suspension system movable between a compressed and uncompressed position, including:
a pair of control links, one for either side of the rear wheel, each having an attachment point for attaching to the hub of the rear wheel, a first pivot point located above the attachment point and a second pivot point located below and forwardly of the attachment point when the suspension system is in the compressed position;
a swing arm assembly having a forward pivot point and a pair of rear pivot points, the forward pivot point adapted to pivotably connect to the frame at or near the bottom of the seat riser tube, the pair of rear pivot points each pivotably connected to the second pivot point of the respective one of the pair of control links;
a control arm assembly having a front pivot point and a pair of back pivot points, the front pivot point pivotably connected to an upper pivot point on the seat riser tube and the pair of back pivot points each pivotably connected to the first pivot point of the respective one of the pair of control links; and
a pull-shock shock absorber connected between the control arm assembly and the frame which is actuated when the suspension is in the compressed position.

6. A suspension bicycle comprising:
a rear wheel with a hub;
a frame including a seat riser tube, a down tube, and a bottom bracket housing,
a rear suspension system movable between a compressed and uncompressed position, including:
a pair of control links, one for either side of the rear wheel, each having an attachment point for attaching to the hub of the rear wheel, a first pivot point located above the attachment point and a second pivot point located below the attachment point when the suspension system is in the compressed position;
a swing arm assembly having a forward pivot point and a pair of rear pivot points, the forward pivot point adapted to pivotably connect to the frame at or near the bottom of the seat riser tube, the pair of rear pivot points each pivotably connected to the second pivot point of the respective one of the pair of control links;
a control arm assembly having a front pivot point and a pair of back pivot points, the front pivot point pivotably connected to an upper pivot point on the seat riser tube and the pair of back pivot points each pivotably connected to the first pivot point of the respective one of the pair of control links; and
a shock absorber connected between the control arm assembly and the down tube which is actuated when the suspension is in the compressed position.

7. A suspension bicycle as defined in claim 6 wherein:

said control arm assembly has a forward portion extending forwardly of said seat tube and a rear portion extending rearwardly of said seat tube; and said forward portion of said control arm assembly positioned at an angle with respect to said rear portion of said control arm assembly.

8. A suspension bicycle as defined in claim 6, wherein:

said control arm assembly has a forward portion extending forwardly of said seat tube and a rear portion extending rearwardly of said seat tube;

said shock absorber is a pull-shock having a plunger; and said forward portion of said control arm assembly being attached to said plunger.

9. A suspension bicycle as defined in claim 7, wherein:

said shock absorber is a pull-shock having a plunger;

said forward portion of said control arm assembly being attached to said plunger; and wherein when said rear portion of said control arm assembly is moved upwardly, said forward portion of said control arm assembly is moved downwardly, pulling said plunger downwardly and actuating said shock absorber.

10. A suspension bicycle having:

a rear wheel with a hub;

a frame including a seat riser tube, a down tube, and a bottom bracket housing;

a rear suspension system movable between a compressed and uncompressed position, including:

a pair of control links, one for either side of the rear wheel, each having an attachment point for attaching to the hub of the rear wheel, a first pivot point located above the attachment point and a second pivot point located below the attachment point when the suspension system is in the uncompressed position;

a swing arm assembly having a forward pivot point and a pair of rear pivot points, the forward pivot point adapted to pivotably connect to the frame at or near the bottom of the seat riser tube, the pair of rear pivot points each pivotably connected to the second pivot point of the respective one of the pair of control links;

a control arm assembly having a front pivot point and a pair of back pivot points, the front pivot point pivotably connected to an upper pivot point on the seat riser tube and the pair of back pivot points each pivotably connected to the first pivot point of the respective one of the pair of control links; and a pull-shock shock absorber connected between the control arm assembly and the frame which actuates to absorb shocks.

11. A suspension bicycle as defined in claim 10 wherein said shock is attached to the down tube.

12. A suspension bicycle as defined in claim 11 wherein:

said control arm assembly has a forward portion extending forwardly of said seat tube and a rear portion extending rearwardly of said seat tube; and said forward portion of said control arm assembly positioned at an angle with respect to said rear portion of said control arm assembly.

13. A suspension bicycle as defined in claim 11, wherein:

said control arm assembly has a forward portion extending forwardly of said seat tube and a rear portion extending rearwardly of said seat tube;

said shock absorber is a pull-shock having a plunger; and said forward portion of said control arm assembly being attached to said plunger.

14. A suspension bicycle as defined in claim 12, wherein:

said shock absorber is a pull-shock having a plunger;

said forward portion of said control arm assembly being attached to said plunger; and wherein when said rear portion of said control arm assembly is moved upwardly, said forward portion of said control arm assembly is moved downwardly, pulling said plunger downwardly and actuating said shock absorber.

* * * * *